Sept. 12, 1933.   R. E. FRICKEY ET AL   1,926,090
WELDING ROD AND PROCESS OF MANUFACTURE
Filed Aug. 13, 1929
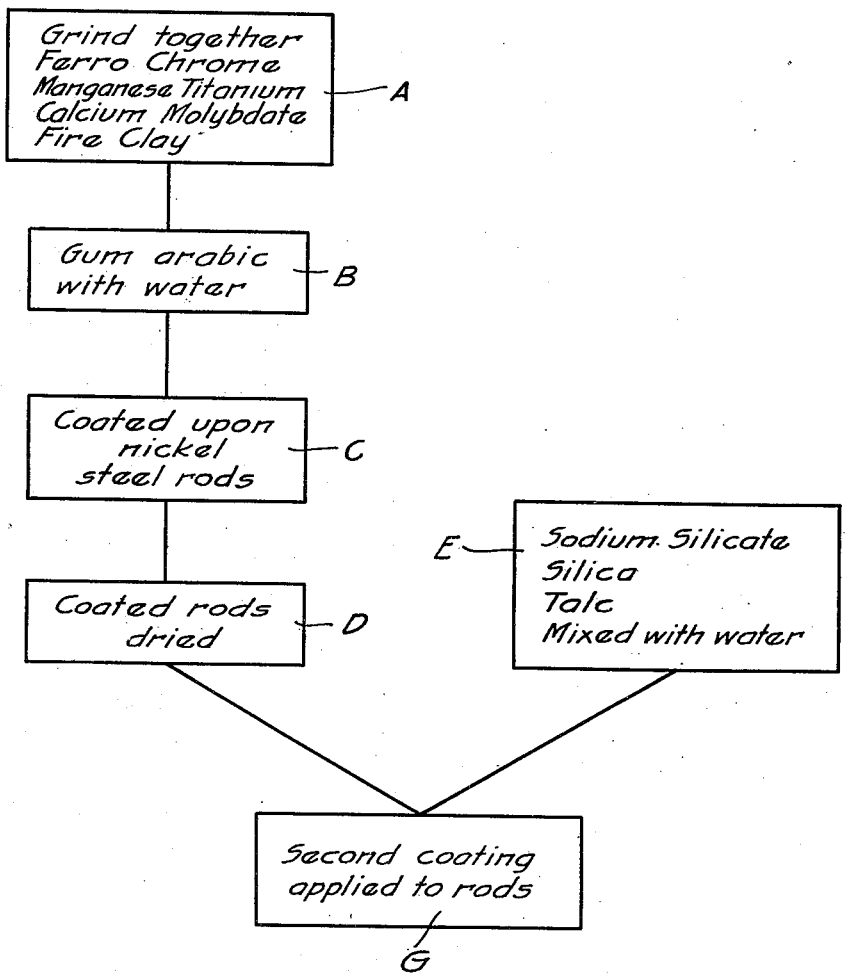
INVENTORS
ROYAL E. FRICKEY
BY ARCHIE W. McCLARY
ATTORNEYS Patented Sept. 12, 1933

1,926,090

UNITED STATES PATENT OFFICE 1,926,090

WELDING ROD AND PROCESS OF MANUFACTURE

Royal E. Frickey, San Francisco, and Archie W. McClary, Oakland, Calif., assignors to Welding Service, Inc., San Francisco, Calif., a corporation of California Application August 13, 1929. Serial No. 385,645

20 Claims. (Cl. 219—8)

This invention relates generally to the construction of rods for depositing metal by electrical welding, to processes for manufacturing the same, and to metal alloy products.

It is a general object of this invention to devise a welding rod which will deposit a relatively hard alloy metal sufficiently ductile and tough to resist cracking under impact.

It is a further object of this invention to devise a welding rod which can be used for applying alloy metal capable of withstanding severe pounding and usage, and which is particularly valuable for refacing or repairing railroad rails.

It is a further object of this invention to devise a welding rod which will make possible application of hard alloy metal without formation of gas or blow holes.

It is a further object of this invention to devise certain novel combinations of elements which can be utilized together in a welding rod, whereby facilitating application of hard alloy metal having highly desirable characteristics.

It is a further object of this invention to devise a welding rod having a novel form of coating upon the same, said coating including certain ingredients which alloy with the material of the rod and other ingredients serving as reducing agents.

It is a further object of this invention to devise a welding rod having a novel form of coating including certain ingredients which alloy with the material of the rod and other ingredients which serve to produce a steady arc without sputtering.

It is a further object of this invention to devise a novel process or method of manufacturing the welding rod of this invention.

Further objects of this invention will appear from the following description in which we have set forth the preferred embodiment of our invention. It is to be understood that the appended claims are to be accorded a range of equivalents consistent with the state of the prior art.

It is frequently desirable to apply hard metal alloys by electrical welding, which have sufficient ductility and toughness to preclude its fracture through sever pounding, but which also has a relatively high degree of hardness compared to ordinary steel. A material of this kind is useful for many purposes such as in building up railroad rails as described in copending application No. 324,856 filed in the name of Archie W. McClary. In the welding rod of this invention we provide a novel combination of a plurality of elements in a welding rod, which when fused by an electric arc, form a relatively hard metal alloy which is comparatively free from blow holes.

The principal elements which we utilize consist of iron, carbon, nickel, chromium, and molybdenum, which are preferably present in the welding rod in the form and combination to be presently described.

When utilizing ingredients in a welding rod such as outlined above, it is preferable to utilize one or more elements as deoxidizing or reducing agents, so that the actual fusion of the metal occurs under deoxidizing or reducing conditions. For this purpose we preferably use at least two different elements which may be termed "heavy metals", as distinguished from alkali earth metals such as sodium or potassium. In the preferred form of my rod the heavy metal elements are manganese and titanium.

While different elements falling within the scope of this invention can be alloyed together to form a metallic welding rod, we preferably utilize a nickel steel rod as a base or core, and apply the remainder of the ingredients in the form of a coating. As will be presently explained, this coating is preferably divided into a plurality of layers, one layer including the element chromium together with fire clay, and another layer including silica. As will be presently explained, the chief function of the clay is to prevent oxidation of certain other constituents of the rod before these constituents are melted.

In the drawing the first step of our process has been indicated by A, and consists in grinding together certain powdered ingredients in dry condition for forming the first coating for the metallic rod. These ingredients preferably include the elements chromium, manganese, titanium, molybdenum and fire clay. The chromium can be conveniently supplied in the form of ferrochrome, the manganese and titanium in the form of manganese-titanium, and the molybdenum in the form of calcium-molybdate. During grinding of these materials, they are reduced to a high state of fineness, each of the metal containing particles are surrounded or coated by the fire clay. The fire clay which we employ is preferably a natural product containing a substantial amount of colloidal matter. After the above ingredients have been ground in dry condition with the fire clay, they are mixed with water to which has been added a suitable binder, such as gum arabic, to form a coating fluid of proper consistency. This step has been indicated at B.

The metallic rods which we coat in our process are preferably made of nickel steel, which contain a certain percentage of carbon in addition to iron and nickel. As indicated at C, the fluid coating material is applied to the surfaces of these rods, as by dipping the rods in the fluid, and then the rods are permitted to dry as indicated at D.

The second fluid coating material has been indicated at E, and preferably consists of a mixture of sodium silicate, silica and talc in finely divided condition, mixed together with water. The sodium silicate serves as a binder and also to a certain extent may aid in proper application or fusion of the metal elements. The presence of silica aids in producing a proper weld metal, and during fusing of the rod, is in part reduced to silicon, probably by titanium. Talc alters the viscosity and melting point of the outer coating. Without talc the outer coating would be too viscous, but with the combination of silica and talc, the outer coating melts at the proper rate and has the proper viscosity and surface tension to spread out evenly over the weld. As indicated at G the second coating is then applied over the first, and after the rods have dried, they are in condition for use.

By way of example, and not by way of limitation, it may be explained that by utilizing the following proportions of material, a welding rod can be produced incorporating our invention. For the first coating material the following proportions of ingredients are satisfactory:

|  | Pounds |
|---|---|
| Ferrochrome | 5.15 |
| Manganese titanium | 1.75 |
| Calcium molybdate | 0.33 |
| Fire clay | 2.00 |
| Gum arabic | 0.60 |
| Water | 2.70 |

The above ingredients produce a fluid which is sufficient for treating 100 lbs. of nickel steel rods, these rods being usually about ¼ inch in diameter.

For the second coating, the amounts of material suitable for treating the same number of pounds of nickel steel rods, are as follows:

|  | Pounds |
|---|---|
| Sodium silicate | 4.15 |
| Silica | 6.00 |
| Talc | 2.00 |
| Water | 2.00 |

Nickel steel rod material suitable for use in making up our welding rods can contain for example 4.50 to 5.25 percent nickel, 0.30 to 0.60 percent manganese, and from 0.00 to 0.17 percent carbon. Metal of this character is known as S. A. E. 2512 nickel steel.

The percentages of the various elements present in the completed rod may vary somewhat within the scope of this invention, but for the amounts stated above, the percentages will be approximately as follows:

|  | Per cent |
|---|---|
| Chromium | 3.37 |
| Manganese | 1.52 |
| Titanium | .49 |
| Molybdenum | .12 |
| Nickel | 4.45 |
| Carbon | .33 |
| Iron | 89.72 |

When the above welding rod is in use, it constitutes one electrode, and an arc is formed between it and the work upon which the weld metal is to be applied. The percentages of the various elements in the weld metal alloy will vary somewhat according to the conditions and the manner in which the welding is carried out. This variation is due largely to varying amounts of iron absorbed from the body to which the metal is generally applied. In a typical instance the weld metal applied to a steel body, analyzed as follows:

|  | Per cent |
|---|---|
| Chromium | 3.07 |
| Manganese | .46 |
| Titanium | .02 |
| Molybdenum | .10 |
| Silicon | .25 |
| Nickel | 3.38 |
| Carbon | .31 to .39 |
| Iron | 92.1+ |

The weld metal produced is particularly remarkable because of its hardness combined with ductility and toughness. Samples show a Brinell hardness ranging from 400 to 450. However in spite of this extreme hardness, the ductility and toughness is such that the metal can successfully withstand severe pounding, such as it is subject to when utilized in building up railroad rails. The ductility and toughness of our weld metal is probably due to the presence of nickel and chromium, whose properties are augmented by the presence of molybdenum. Manganese, silicon and carbon serve to add hardness to the alloy. Manganese and titanium are heavy metals which function as powerful reducing or deoxidizing agents. In other words, at the temperature of the electric arc, they have a strong affinity for oxygen, and therefore prevent oxidation of other ingredients which go to make up the weld metal alloy. In addition to serving as a deoxidizer or reducer, titanium serves to remove nitrogen from the fused weld metal, thus preventing brittleness in the weld metal.

Fire clay has been found to be a very beneficial ingredient. Without this ingredient, the fused weld metal is apt to boil, probably due to the formation of gases, and such boiling causes formation of objectionable blow holes. Without the presence of fire clay, reducing agents are not sufficient to prevent this boiling. However with fire clay this detrimental boiling is substantially obviated. The manner in which this ingredient minimizes boiling is not clearly understood, but it probably prevents the formation of certain metallic oxides, which in turn are reduced by carbon to form troublesome gases. It has been found that the advantageous results secured by fire clay are not so marked when the clay is simply mixed with the other ingredients of the coating, without being first ground with the divided metallic ingredients. It is probable that the grinding operation intimately coats the metallic particles with fire clay and also secures greater concentration of the fire clay upon each particle. By reason of the grinding operation, a minimum quantity of clay can be used to produce the desired effect without the formation of troublesome slag. In this connection it may be noted that the clay functions principally as an agent for preventing bubbling and formation of blow-holes, and not as a slag forming means.

The gum arabic which we prefer to employ has been found to be far superior to sodium silicate, which has previously been used as a binder in coating welding rods, since it does not produce a slag and does not give off water with explosive violence.

In performing their functions as reducing agents, manganese and titanium produce a considerable amount of heat in the deposited metal, which heat serves to keep the deposited metal in fluid condition, thus permitting a thin and even deposit of metal.

We claim:

1. A welding rod comprising a nickel steel core, a first coating on the core consisting of chromium, molybdenum, a deoxidizer, and fire clay, in proportions and form exemplified by 5.15 parts ferrochrome, 0.33 parts calcium molybdate, 1.75 parts manganese titanium, and 2 parts fire clay, and a second coating of talc and silica retained in a silicate adhesive.

2. In a method of manufacturing welding rods, the steps comprising grinding together materials containing chromium, molybdenum, a deoxidizer, and fire clay, as exemplified by 5.15 parts ferrochrome, 0.33 parts calcium molybdate, 1.75 parts manganese titanium, and 2 parts fire clay, adding a suitable binder to the mixture, and coating the mixture on a welding rod.

3. A welding rod consisting of a base rod of nickel steel coated with material containing substantial quantities of chromium, as exemplified by about 3.37 per cent of the entire rod.

4. A metallic welding rod having a homogeneous coating containing the elements molybdenum and manganese in amounts exemplified by about 0.12 and 1.52 per cent respectively, of the entire rod.

5. A metallic welding rod having a homogeneous coating containing the elements molybdenum and titanium in amounts exemplified by about 0.12 and 0.49 per cent respectively, of the entire rod.

6. A metallic welding rod having a homogeneous coating containing the elements molybdenum, titanium and manganese in amounts exemplified by about 0.12, 0.49 and 1.52 per cent respectively, of the entire rod.

7. A metallic welding rod having a coating containing the elements chromium and titanium in amounts exemplified by 3.37 and 0.49 per cent respectively, of the entire rod.

8. A metallic welding rod having a coating containing the elements chromium, molybdenum and titanium, in amounts and proportions exemplified by 3.37, 0.12 and 0.49 respectively, of the entire rod.

9. A metallic rod containing the elements chromuim, molybdenum, titanium and manganese, in amounts and proportions exemplified by about 3.37, 0.49, 1.52 and 3.37 per cent, respectively, of the entire rod.

10. A metallic welding rod having a coating containing chromium as exemplified by about 3.37 per cent of the entire rod, and an amount of fire clay sufficient to prevent the formation of objectionable gases, the proportion of the chromium to the fire clay being exemplified by 5.15 parts of ferrochrome to 2 parts fire clay.

11. A metallic welding rod having a coating containing chromium and molybdenum in amounts exemplified by about 3.37 and 0.12 per cent respectively, of the entire rod, and an amount of fire clay sufficient to prevent the formation of objectionable gases, the proportioning of the fire clay to the chromium and molybdenum being exemplified by 5.15 parts ferrochrome, 0.33 parts calcium molybdate, and 2 parts fire clay.

12. A metallic steel welding rod having a coating containing chromium as exemplified by 3.37 per cent of the entire rod, and an amount of fire clay sufficient to prevent the formation of objectionable gases, the proportioning between the chromium and the fire clay being exemplified by 5.15 parts ferrochrome to 2 parts fire clay.

13. A metallic welding rod having a plurality of superposed coatings, one of which contains chromium and fire clay and the other of which contains silica, the proportioning between the chromium and the fire clay being exemplified by 5.15 parts ferrochrome to 2 parts fire clay.

14. A metallic welding rod having a plurality of superposed coatings, one of which contains chromium, a deoxidizing material and fire clay, and the other of which contains silica, the proportioning between the chromium and the fire clay being exemplified by 5.15 parts ferrochrome and 2 parts fire clay.

15. A welding rod consisting of a base metal core having applied thereto a homogeneous coating including the elements of chromium, manganese, titanium and molybdenum, together with fire clay, the coating being exemplified by 5.12 parts by weight of ferrochrome, 1.75 parts of manganese titanium, 0.33 parts of calcium molybdate, and 2 parts fire clay.

16. A welding rod consisting of a base metal core having applied thereto a homogeneous coating including the elements of chromium, manganese, titanium and molybdenum, together with fire clay, the coating being in proportions exemplified by 5.15 parts by weight of ferrochrome, 1.75 parts of manganese titanium, 0.33 parts of calcium molybdate, and 2 parts fire clay, and having a second outer coating of talc and sodium silicate.

17. In a method of manufacturing welding rods, the steps comprising grinding together materials including chromium, molybdenum, fire clay, and a deoxidizer, as exemplified by the proportions of 5.15 parts by weight of ferrochrome, 0.33 parts of calcium molybdate, 2 parts fire clay, and 1.75 parts manganese titanium, adding water and a suitable binder, and coating the mixture on a base metal welding rod.

18. A welding rod having a coating containing divided oxidizable metallic particles, said particles being intimately surrounded by refractory material containing solids of colloidal fineness.

19. In a method of manufacturing welding rods, the steps comprising grinding together a refractory material containing solids of colloidal fineness with divided metallic material, as for example ferrochrome, adding suitable proportions of water, as exemplified by 5.15 parts ferrochrome to 2 parts water, and then coating the mixture on a base metal rod.

20. A welding rod comprising a base metal core and a coating thereon containing chromium as exemplified by about 3.37 per cent of the entire rod, the coating also containing an amount of fire clay having solids of colloidal fineness sufficient to prevent formation of objectionable gases, the chromium being in divided form and the particles thereof being intimately surrounded by the fire clay, the proportion of the chromium to the fire clay being exemplified by about 5.15 parts of ferrochrome to 2 parts fire clay.

ROYAL E. FRICKEY.
ARCHIE W. McCLARY.